May 17, 1960 F. C. WELLMAN 2,937,342

PHASE MODULATION OR DETECTION CIRCUIT

Filed Dec. 28, 1953

INVENTOR
FRANCIS C. WELLMAN
BY
Thomas M. Ferrill, Jr.
ATTORNEY 2,937,342
Patented May 17, 1960

2,937,342

PHASE MODULATION OR DETECTION CIRCUIT

Francis C. Wellman, Bellmore, N.Y., assignor to Sperry Rand Corporation, a corporation of Delaware Application December 28, 1953, Serial No. 400,497

8 Claims. (Cl. 332—16)

This invention relates to an electrical circuit which may be used as a phase modulator or a demodulator, and more particularly, is concerned with a circuit which may be utilized as a D.-C. signal sensing device for producing an alternating output signal the phase of which is dependent on the polarity of the input, and the amplitude of which is dependent on instantaneous potential of the input, or which may be utilized, by interchanging the output and input, as a phase modulator providing a suppressed-carrier type modulation.

It is the general object of this invention to provide an improved circuit which may be used as a modulator or demodulator in servo systems or the like and which is characterized by its simplicity, efficiency, ruggedness, and long operating life.

Another object of this invention is the provision of a phase modulation or demodulation circuit utilizing transistors.

Another object of this invention is to provide a modulator-demodulator circuit which is a low impedance device producing moderate output power with small input voltages.

Another object of this invention is to provide a modulator-demodulator circuit in which there is substantially no unbalance due to differences in transistors and in which there is negligible drift in the null.

These and other objects of the invention which will become apparent as the description proceeds are achieved by the provision of a circuit comprising first and second transistors symmetrically connected with base connected to base and emitter connected to emitter. A reference voltage or carrier signal is coupled between the bases and emitters, and a transformer and a resistor are connected in series between the respective collectors. When operated as a phase modulator, for example, a modulation signal is coupled across the series resistor in the collector circuit and the modulated output signal is derived across the series transformer in the collector circuit.

Figure 1:
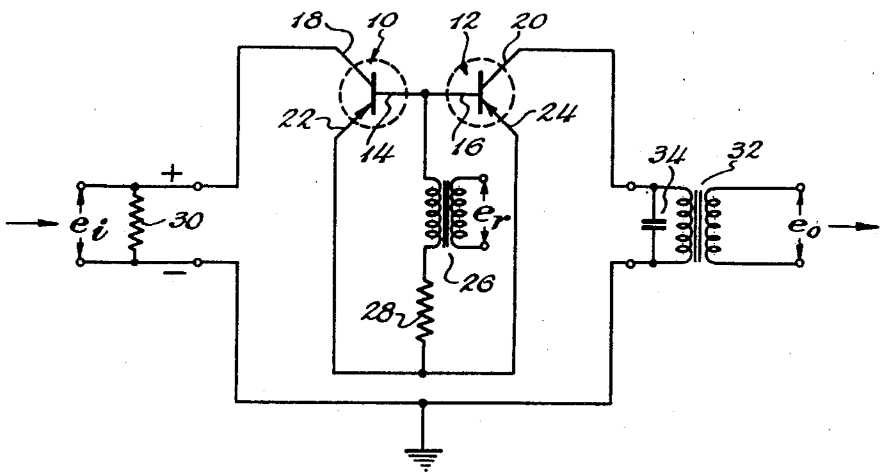
Figure 2:
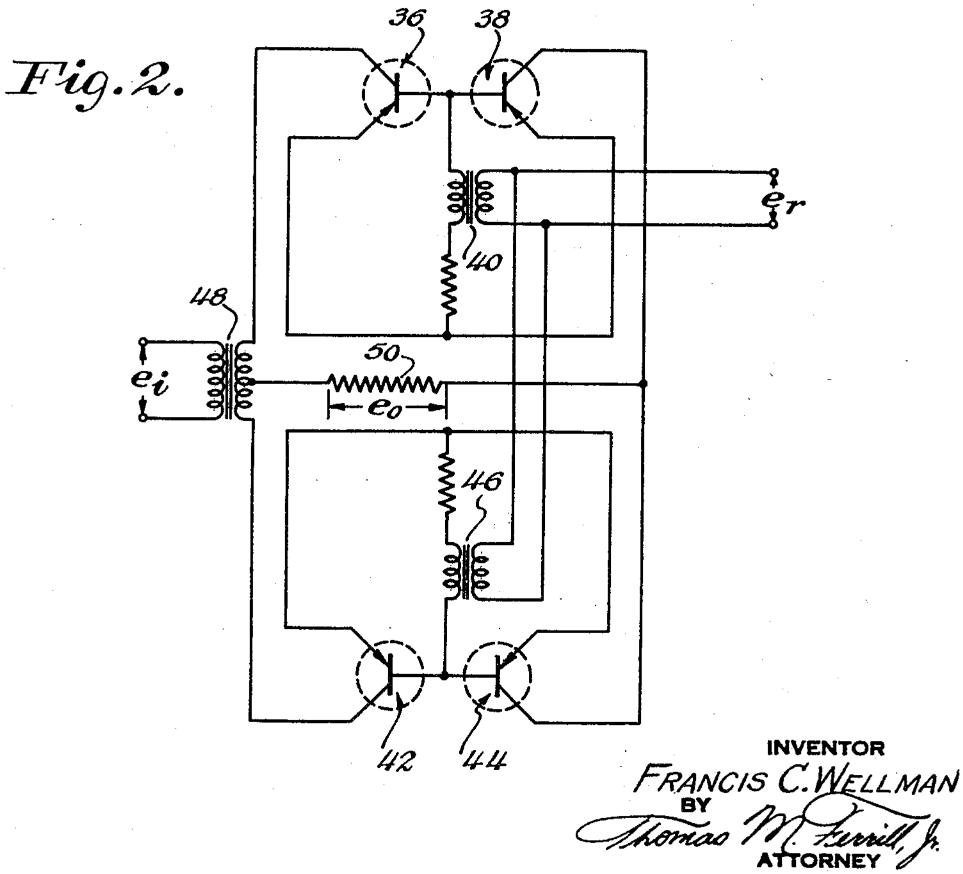

For a better understanding of the invention reference should be had to the accompanying drawing, wherein:

Fig. 1 is a schematic diagram of a half wave version of the circuit of the present invention; and Fig. 2 is a schematic diagram of a full wave version of the circuit of the present invention.

Referring to Fig. 1, the numerals 10 and 12 indicate generally a pair of similar transistors, which may be of any of the three terminal semi-conductor types available commercially, such as point contact, n-p-n junction, or p-n-p junction transistors. The transistors 10 and 12 include respectively base electrodes 14 and 16, collector electrodes 18 and 20, and emitter electrodes 22 and 24.

The circuit of Fig. 1 is symmetrical in configuration, with the base electrodes 14 and 16 being electrically joined and the emitter electrodes 22 and 24 also being electrically joined. A reference voltage $e_r$ is applied between the base electrodes and the emitter electrodes of the transistors 10 and 12 by means of a transformer 26, the secondary of which is connected, in series with a current limiting resistor 28, between the joined base electrodes and the joined emitter electrodes. An input signal $e_i$ is applied between the collector 18 of the transistor 10 and ground while the output signal $e_o$ is derived between the collector electrode 20 of the transistor 12 and ground, so that in effect the input circuit and output circuit are connected in series between the respective collectors of the two transistors 10 and 12.

Where the circuit of Fig. 1 is operated as a modulator it may be desirable to have the input signal $e_i$ coupled across an input resistor 30 with the output signal $e_o$ being coupled out by a transformer 32. A resistor is used for coupling in the input signal because $e_i$, the modulation signal, may be a D.-C. voltage of varying amplitude and even of reversible polarity, while a transformer is preferably used in the output circuit to provide some voltage amplification of the modulated signal by virtue of the voltage step-up ratio of the transformer.

Operation of the circuit as above described may be best understood by considering the action of the transistors 10 and 12, each of which may be, for the purpose of illustration, a p-n-p junction transistor.

When the collector voltage is positive with respect to the base, the collector current is independent of emitter current and the base-to-collector impedance is very low. For negative collector voltages, the collector-to-base impedance is dependent on the emitter current. When the emitter current is negative, the collector-to-base impedance is very high. However, when the emitter current is positive, current may flow from collector to base, the amount of current being controlled by the emitter current. The latter condition is the conventional small-signal type operation of the transistor.

In the phase modulator circuit the transistors merely act as a chopper converting the input signal $e_i$ to a square wave whose amplitude depends on the magnitude of the input signal, with the instantaneous polarity of the input signal determining the relative phase of the output signal $e_o$ with respect to the reference signal $e_r$. There is no power gain. With the phase of the reference voltage $e_r$ such that the emitters 22 and 24 are negative with respect to the base electrodes 14 and 16, the transistors 10 and 12 act as diodes connected back to back, so that regardless of the instantaneous polarity of the input voltage $e_i$, either one or the other of the transistors 10 and 12 appears as a high impedance. Thus substantially no current flows in the collector circuit and any load connected in series therewith. On the next half cycle of the reference voltage $e_r$, the emitters 22 and 24 are positive with respect to the base electrodes 14 and 16, so that emitter current can flow in the transistors 10 and 12. Collector current can then flow even though the collector is negative with respect to the base. Current flows through the respective collectors to the load in a direction determined by the instantaneous polarity of the input signal $e_i$.

Thus it will be seen that the output voltage $e_o$ is a chopped wave having a frequency of the reference voltage $e_r$ and a relative phase which is determined by the polarity of the input signal $e_i$. If the emitter current is large enough so as not to limit the current flowing in the collector circuit, the amplitude of the oputput signal $e_o$ must be directly proportional to the magnitude of the input signal $e_i$. It may be desirable to provide some filtering to improve the waveform of the output signal, such as a capacitor 34 which bypasses the higher frequency harmonic components of the modulated output.

The circuit of Fig. 1 may be operated equally as well as a demodulator by applying a modulated suppressed-carrier wave across the transformer 32. The circuit operates as a half-wave switching demodulator in which the transistors simply act as a phase sensitive switch in series with the load that appears across the resistor 30.

Again during the half cycle in which the reference voltage $e_r$ drive the emitters 22 and 24 negative with respect to the base electrodes 14 and 16, the transistors appear as diodes connected back to back so as to provide a high impedance in series with the load regardless of the instantaneous polarity of the input signal. However, on the next half cycle of the reference voltage $e_r$, emitter current flows in the transistors 10 and 12 and the transistors appear as a low impedance in series with the load. Thus, depending on the relative phase between the input signal $e_i$ and the reference voltage $e_r$, an output voltage of one polarity or the other is established across the load, providing a half wave rectified D.-C. voltage across the resistor 30 whose polarity is determined by the relative phase between the modulated input signal and the reference voltage, and whose magnitude is proportional to the amplitude of the modulated input voltage.

The impedance in the collector circuit as provided by the resistor 30 and the transformer 32, and the impedance in the emitter circuit as provided by the transformer 26 and resistor 28, are chosen so as to maintain the current in the emitter and collector circuits within the safe operating limits of the transistors 10 and 12.

Referring to Fig. 2, there is shown a full wave version of the same circuit, the full wave version being essentially a pair of half-wave units connected back to back. The circuit includes a first pair of transistors 36 and 38 having their base electrodes and emitter electrodes respectively connected together with a reference voltage being applied between the emitter electrodes and base electrodes by means of a transformer 40. Similarly a second pair of transistors 42 and 44 are symmetrically connected with their base electrodes joined together and their emitter electrodes joined together, with the reference voltage $E_r$ being coupled between the base electrodes and the emitter electrodes by means of a transformer 46. The phase of the reference voltage applied between the emitter and base electrodes of the first pair of transistors 36 and 38 relative to the reference voltage applied between the emitter and base electrodes of the second pair of transistors 42 and 44 is such that current flows in the emitter circuit of the first pair of electrodes during the half cycle in which no current flows in the emitter circuit of the other pair of transistors. The modulated voltage is coupled to the two collector circuits by means of a transformer 48 having a center-tapped secondary, the modulation signal being derived across a common load resistor 50.

The full wave version of Fig. 2 operates as two half-wave units which operate on alternate half cycles of the reference voltage $e_r$. Although the full wave circuit can be operated as either a modulator or demodulator, the full wave version is particularly useful as a demodulator since it produces a full wave rectified signal across the common load resistor 50, reducing the ripple factor and the amount of filtering that may be required.

From the above description it will be recognized that the various objects of the invention have been achieved by the provision of a circuit incorporating transistors, which may be used as a modulator or demodulator. The circuit is particularly useful for operating into a low impedance load, such as a magnetic amplifier or the like. One of the advantages of the present circuit over known vacuum tube types of modulators and demodulators is that it may be used with very low signal voltages without instability or error due to non-linearity. It should be noted that while the circuit is described as having the modulation signal coupled across a resistor and the modulated wave coupled across a transformer, such arrangement, while preferred, is not essential to the operation of the circuit as described. It will be appreciated from the above description that the circuit of Fig. 1 can be considered as a bilaterally conductive two-terminal electronic switch. The series impedance of the two transistors is controlled by the emitter current of the respective one of the transistors having emitter control, depending on the direction of current flow through the switch.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrical circuit comprising first and second transistors having their bases directly connected together and their emitters directly connected together, first means for coupling an alternating voltage signal between the bases and emitters of said first and second transistors, third and fourth transistors having their bases directly connected together and their emitters directly connected together, second means for coupling an alternating voltage signal between the bases and emitters of said third and fourth transistors, a transformer having a center-tapped secondary winding connected between the collectors of said first and third transistors, and a resistor connected between the centertap of said secondary winding and the collectors of said second and fourth transistors 2. An electrical circuit comprising first and second transistors having their bases connected together and their emitters connected together, first means for coupling an alternating voltage signal between the bases and emitters of said first and second transistors, third and fourth transistors having their bases directly connected together and their emitters directly connected together, second means for coupling an alternating voltage signal between the bases and emitters of said third and fourth transistors, impedance means connected between the collectors of said first and third transistors, and impedance means connected between the mid-point of said first named impedance means and the collectors of said second and fourth transistors.

3. A circuit comprising first and second transistors of similar conductive type, each including a base, an emitter, and a collector, the respective bases being directly connected together and the respective emitters being directly connected together, means for coupling an alternating voltage signal between the bases and emitters of the transistors, and a transformer and a resistor, one winding of the transformer being connected in series with the resistor between the respective collectors.

4. A circuit comprising first and second transistors of the same conductive type, each including a base, an emitter, and a collector, the respective bases being directly connected together and the respective emitters being directly connected together, means for coupling an alternating voltage reference signal between the bases and emitters of the transistors, and first and second impedance means connected in series between the respective collectors.

5. A phase modulator-demodulator circuit comprising first and second transistors each having a base electrode, an emitter electrode, and a collector electrode, means for coupling an alternating voltage reference signal across the emitter and base electrodes of the respective transistors, an input impedance and an output impedance, the transistors being series connected with their base and collector electrodes forming a closed loop conductive path with the input and output impedances, means coupled to the input impedance for applying an input signal across said input impedance, and means coupled to the output impedance for deriving an output signal from said output impedance.

6. A two-terminal bilaterally conductive switch comprising a pair of transistors of similar conductive type, each transistor having a base electrode and at least two additional electrodes including an emitter electrode and a collector electrode, one of said additional electrodes of one of the transistors being directly connected to the corresponding electrode of the other transistor, the other of said additional electrodes of the transistors being respectively directly connected to the two terminals of the switch, whereby a series current conductive path is provided between the terminals of the switch through the two transistors, and means for controlling current flow in either direction through the switch including means for applying a variable control current through the base electrodes.

7. A two-terminal bilaterally conductive electronic switch comprising a pair of transistors of similar conductive type, each transistor including first, second, and third electrodes, the first electrodes of the two transistors being directly connected together, the second electrodes of the two transistors being directly connected respectively to the terminals of the switch, whereby a series current conductive path is provided between the terminals of the switch through the two transistors, and means for controlling current flow in either direction through the switch including means for applying a variable current through the third electrodes of said transistors to modify the impedance between the first and second electrodes.

8. A circuit comprising first and second transistors of the same conductive type, each including a base and at least two additional electrodes including an emitter electrode and a collector electrode, the respective bases being directly connected together and a corresponding one of each of said additional electrodes being directly connected together, means for coupling an alternating voltage reference signal between the bases and said corresponding ones of the additional electrodes, and first and second impedance means connected in series between the others of said additional electrodes, one of said impedance means being adapted to receive an input signal and the other of said impedance means developing an output signal.

References Cited in the file of this patent

UNITED STATES PATENTS 1,933,627 Jaumann ---------------- Nov. 7, 1933
2,502,095 Korman ---------------- Mar. 28, 1950

OTHER REFERENCES

Electronics, March 1953, pages 112–113.